US010988059B2

(12) United States Patent
Kanamori

(10) Patent No.: US 10,988,059 B2
(45) Date of Patent: Apr. 27, 2021

(54) SEAT FOR VEHICLE

(71) Applicant: Toyota Jidosha Kabushiki Kaisha, Toyota (JP)

(72) Inventor: Jun Kanamori, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/573,436

(22) Filed: Sep. 17, 2019

(65) Prior Publication Data

US 2020/0108746 A1    Apr. 9, 2020

(30) Foreign Application Priority Data

Oct. 9, 2018 (JP) .............................. JP2018-190823

(51) Int. Cl.
*B60N 2/02* (2006.01)
*B60N 2/30* (2006.01)
*B60N 2/32* (2006.01)
*B60N 2/36* (2006.01)

(52) U.S. Cl.
CPC ............. *B60N 2/36* (2013.01); *B60N 2/0232* (2013.01)

(58) Field of Classification Search
CPC ................................ B60N 2/36; B60N 2/0232
USPC ...... 297/188.08, 188.09, 248, 311, 331, 337, 297/338; 296/65.09
See application file for complete search history.

(56) References Cited

U.S. PATENT DOCUMENTS

| | | | | |
|---|---|---|---|---|
| 3,807,790 A * | 4/1974 | Erard | ..................... | B60N 2/305 296/66 |
| 3,902,755 A * | 9/1975 | Sirot | .................... | B60N 2/0292 297/339 |
| 4,848,826 A * | 7/1989 | Kuwabara | ............ | B60N 2/3009 296/97.23 |
| 5,112,018 A * | 5/1992 | Wahls | .................. | B60N 2/0232 297/339 X |
| 5,950,977 A * | 9/1999 | Proksch | ................. | B60N 2/502 108/145 |
| 5,997,083 A * | 12/1999 | Ono | ........................ | B60N 2/309 297/236 |
| 6,758,520 B2 * | 7/2004 | Pehrson | ............... | B60N 2/3013 297/216.1 |
| 6,874,667 B2 * | 4/2005 | Dykstra | .................... | B60R 5/04 296/37.14 X |
| 7,029,063 B2 * | 4/2006 | Holdampf | .............. | B60N 2/206 296/66 X |
| 7,452,019 B1 * | 11/2008 | Day | ..................... | B60N 2/0232 296/65.16 |

(Continued)

FOREIGN PATENT DOCUMENTS

DE    20003809 U1    7/2001
EP    3375660 A1    9/2018

(Continued)

OTHER PUBLICATIONS

Extended European Search Report dated Feb. 28, 2020 in European Application No. 19196010.3.

*Primary Examiner* — Rodney B White
(74) *Attorney, Agent, or Firm* — Dinsmore & Shohl LLP

(57) ABSTRACT

A seat for a vehicle includes a seat cushion configured to move between a seat position at which an occupant to be seated in the seat cushion and a shelf position moved upward from the seat position substantially in parallel.

18 Claims, 15 Drawing Sheets

(56) References Cited

U.S. PATENT DOCUMENTS

| | | | | |
|---|---|---|---|---|
| 7,658,434 B2* | 2/2010 | Sakane | ............... | B60R 1/002 296/76 |
| 7,688,582 B2* | 3/2010 | Fukazu | ............... | B60L 50/66 296/65.16 X |
| 7,914,062 B2* | 3/2011 | Iwasa | ............... | B60N 2/3065 296/65.09 |
| 8,485,583 B2* | 7/2013 | Mather | ............... | B60N 2/3075 296/65.09 |
| 8,789,868 B1* | 7/2014 | Sachs | ............... | B60R 7/02 296/37.1 |
| 9,016,778 B2* | 4/2015 | Hellman | ............... | A47C 4/54 297/188.09 |
| 9,227,569 B2* | 1/2016 | Giorgis | ............... | B60R 5/045 |
| 9,333,885 B2* | 5/2016 | Verhee | ............... | B60N 2/3093 |
| 9,421,886 B2* | 8/2016 | Cecinas | ............... | B60N 2/68 |
| 10,336,222 B2* | 7/2019 | Jensen | ............... | B60N 2/3075 |
| 10,696,198 B2* | 6/2020 | Line | ............... | B60N 2/508 |
| 2007/0040418 A1* | 2/2007 | Ohkuma | ............... | B60N 2/3075 297/15 |
| 2007/0132266 A1* | 6/2007 | Ghergheli | ............... | B60N 2/36 296/65.09 |
| 2007/0152480 A1* | 7/2007 | Muin | ............... | B64D 11/0636 297/188.08 |
| 2013/0062903 A1* | 3/2013 | Mather | ............... | B60N 2/3031 296/64 |
| 2017/0240068 A1* | 8/2017 | Ramachandra | ............... | B60N 2/1615 |
| 2019/0299824 A1* | 10/2019 | Ito | ............... | B60N 2/3065 |

FOREIGN PATENT DOCUMENTS

| | | |
|---|---|---|
| FR | 2979860 A1 | 3/2013 |
| FR | 2993519 A1 | 1/2014 |
| JP | H04083926 U | 7/1992 |
| JP | 2016-022803 A | 2/2016 |
| JP | 2018-103945 A | 7/2018 |

* cited by examiner

SEAT FOR VEHICLE

CROSS-REFERENCE TO RELATED APPLICATIONS

This application claims priority to Japanese Patent Application No. 2018-190823 filed on Oct. 9, 2018, which is incorporated herein by reference in its entirety including the specification, drawings and abstract.

BACKGROUND

1. Technical Field

The disclosure relates to a seat for a vehicle and particularly relates to a rear seat for a vehicle.

2. Description of Related Art

Various seat arrangements are proposed to secure a luggage space in a vehicle (for example, see Japanese Unexamined Patent Application Publication No. 2016-022803 (JP 2016-022803 A), Japanese Unexamined Patent Application Publication No. 2018-103945 (JP 2018-103945 A)). JP 2016-022803 A discloses a technology in which a seat cushion is flipped up toward a seatback side around a rear end of a seat cushion as a rotation center. Further, JP 2018-103945 A discloses a technology in which a seatback is tilted by being rotated toward a seat cushion side around a lower end of the seatback as a rotation center.

In a case where an occupant is only a driver's seat occupant or occupants are only a driver's seat occupant and an assistant driver's seat occupant in a vehicle, that is, in a case where an occupant is only a front seat's occupant in the vehicle, a seat cushion of a rear seat may be used as a place to store luggage. However, in the seat for the vehicle, in a case where the rear seat is usable as a seat, when an occupant in the front seat in the vehicle reaches out for luggage put on the seat cushion of the rear seat, the occupant needs to stretch out the hand rearward in the vehicle front-rear direction and diagonally downward. Further, the top face of the seat cushion is an inclined surface inclined rearward in the vehicle front-rear direction and diagonally downward in order to restrain an occupant from moving forward in the vehicle front-rear direction from the seat cushion in case of a brakes operation and the like. Accordingly, the luggage easily moves rearward in the vehicle front-rear direction on the seat cushion. On that account, the occupant in the front seat might not be able to reach the luggage. Further, in a case where the seat cushion is flipped up toward the seatback side or in a case where the seatback is tilted by being rotated toward the seat cushion, the seat cushion is difficult to be used as a place to store luggage.

SUMMARY

The disclosure provides a seat for a vehicle, and the seat allows an occupant in a front seat in the vehicle to easily access luggage put on a seat cushion of a rear seat.

A first aspect of the disclosure relates to a seat for a vehicle. The seat includes a seat cushion configured to move between a seat position at which an occupant to be seated in the seat cushion and a shelf position moved upward from the seat position substantially in parallel.

In the first aspect, the seat for the vehicle may include a seatback.

In the first aspect, the seat cushion may be configured to move between the seat position and the shelf position moved upward from the seat position substantially in parallel. On this account, when the seat cushion is placed at the seat position, the seat for the vehicle is usable as a seat. Further, when the seat cushion is moved upward substantially in parallel so that the seat cushion is placed at the shelf position, the seat cushion is usable as a shelf. Hereby, the seat for the vehicle is usable effectively.

Further, when a seat cushion of a rear seat is placed at the shelf position, an occupant seated in a front seat just needs to substantially horizontally stretch out the hand rearward in the vehicle front-rear direction to reach out for luggage put on the seat cushion of the rear seat. On this account, in comparison with a case where the occupant in the front seat stretches out the hand rearward in the vehicle front-rear direction and diagonally downward, a distance from the occupant in the front seat (the shoulder of the occupant) to the luggage becomes short, so that the occupant in the front seat can easily access the luggage put on the seat cushion of the rear seat.

In the first aspect, when the seat cushion is placed at the shelf position, a space may be formed between the seat cushion and a floor surface of the vehicle, the floor surface being placed below the seat cushion. The space may communicate with a luggage room of the vehicle in the vehicle front-rear direction.

In the above configuration, since the space below the seat cushion communicates with the luggage room in the vehicle front-rear direction, it is possible to store elongated luggage in the vehicle.

In the first aspect, a top face of the seat cushion may include an inclined surface inclined rearward in the vehicle front-rear direction and downward in the vehicle height direction when the seat cushion is placed at the seat position. An angle between the inclined surface and a horizontal plane when the seat cushion is placed at the shelf position may be smaller than an angle between the inclined surface and the horizontal plane when the seat cushion is placed at the seat position.

In the above configuration, the angle between the inclined surface and the horizontal plane when the seat cushion is placed at the shelf position is smaller than the angle between the inclined surface and the horizontal plane when the seat cushion is placed at the seat position. Accordingly, the luggage can hardly move rearward in the vehicle front-rear direction on the seat cushion. On this account, when the occupant in the front seat reaches out for the luggage put on the seat cushion, of the rear seat, that is placed at the shelf position, the occupant can easily access the luggage.

In the first aspect, a contact position between the seatback and a top face of the seat cushion when the seat cushion is placed at the shelf position may be placed forward in the vehicle front-rear direction from a contact position between the seatback and the top face of the seat cushion when the seat cushion is placed at the seat position.

In the above configuration, the contact position between the seatback and the top face of the seat cushion when the seat cushion is placed at the shelf position is placed forward in the vehicle front-rear direction from the contact position when the seat cushion is placed at the seat position. Accordingly, a distance by which the luggage put on the seat cushion is movable rearwardly relative to the seat cushion can be reduced. On this account, when the occupant in the front seat reaches out for the luggage put on the seat cushion, of the rear seat, that is placed at the shelf position, the occupant can easily access the luggage.

In the first aspect, the seatback may include a seatback lower, and a seatback upper configured to pivot in the vehicle front-rear direction relative to right and left side walls of the vehicle. When the seat cushion is placed at the seat position, a lower end of the seatback lower may make contact with a top face of the seat cushion, and the seatback upper may be placed above the seatback lower. When the seat cushion is placed at the shelf position, the seatback lower may be placed behind the seatback upper in the vehicle front-rear direction, the seatback upper may pivot relative to the side walls of the vehicle so that a lower end of the seatback upper is placed forward in the vehicle front-rear direction in comparison with a case where the seat cushion is placed at the seat position, and the lower end may make contact with the top face of the seat cushion.

In the above configuration, when the seat cushion is placed at the shelf position, the seatback upper pivots relative to the right and left side walls of the vehicle so that the lower end is placed forward in the vehicle front-rear direction in comparison with a case where the seat cushion is placed at the seat position, and the lower end may make contact with the top face of the seat cushion. On this account, the contact position between the seatback and the top face of the seat cushion when the seat cushion is placed at the shelf position can be placed forward in the vehicle front-rear direction from the contact position between the seatback and the top face of the seat cushion when the seat cushion is placed at the seat position. Accordingly, the distance by which the luggage put on the seat cushion is movable rearwardly relative to the seat cushion can be reduced. As a result, when the occupant in the front seat reaches out for the luggage put on the seat cushion, of the rear seat, that is placed at the shelf position, the occupant can easily access the luggage.

Further, when the seat cushion is placed at the shelf position, the seatback lower is placed behind the seatback upper in the vehicle front-rear direction, and the lower end of the seatback upper makes contact with the top face of the seat cushion. Accordingly, in comparison with a case where the seatback does not employ a divided structure constituted by the seatback upper and the seatback lower and the seatback just rotates so that the lower end moves forward in the vehicle front-rear direction relative to the right and left side walls of the vehicle and the lower end makes contact with the top face of the seat cushion, it is possible to restrain such a situation that the contact position between the seatback and the top face of the seat cushion moves forward too much in the vehicle front-rear direction. Accordingly, it is possible to secure a relatively large depth, as a shelf, of the seat cushion placed at the shelf position.

In the first aspect, at least one of right and left side walls of the vehicle, the right and left side walls being placed on outer sides of the seat in the vehicle right-left direction, may be provided with an arm rest to be used by an occupant seated in the seat cushion placed at the seat position. When the seat cushion is placed at the seat position, a top face of the seat cushion may be placed below a top face of the arm rest. When the seat cushion is placed at the shelf position, the top face of the seat cushion may be placed substantially at the same height as the top face of the arm rest in the vehicle height direction.

In the above configuration, when the seat cushion is placed at the shelf position, the top face of the seat cushion is placed substantially at the same height position as the top face of the arm rest. Accordingly, the top face of the arm rest and the top face of the seat cushion can be used as one shelf surface, thereby making it possible to enlarge a luggage storage space in the vehicle right-left direction.

In the first aspect, the movement of the seat cushion in the vehicle height direction may be performed electrically.

In the above configuration, the movement of the seat cushion in the vehicle height direction is performed electrically. Accordingly, in comparison with a case where the movement of the seat cushion in the vehicle height direction is performed manually, the movement of the seat cushion in the vehicle height direction can be easily performed. Further, sense of quality can be given to the movement of the seat cushion in the vehicle height direction.

In the first aspect, the movement of the seat cushion in the vehicle height direction may be performed manually.

In the above configuration, since the movement of the seat cushion in the vehicle height direction is performed manually, the configuration can be achieved at a low cost in comparison with a case where the movement of the seat cushion in the vehicle height direction is performed electrically.

In the first aspect, the seat cushion may be provided with a helper spring configured to bias the seat cushion upward.

In the above configuration, even in a case where the movement of the seat cushion in the vehicle height direction is performed manually, the biasing force of the helper spring is usable when the seat cushion is moved from the seat position to the shelf position, thereby making it possible to easily move the seat cushion.

In the first aspect, the seat cushion may be provided with a projecting portion configured to project upward in a vehicle height direction.

In the first aspect, a first position of the projecting portion may be placed forward of a second position of the projecting portion in a vehicle front-rear direction. The first position may be a position of the projecting portion when the seat cushion is placed at the shelf position. The second position may be a position of the projecting portion when the seat cushion is placed at the seat position.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
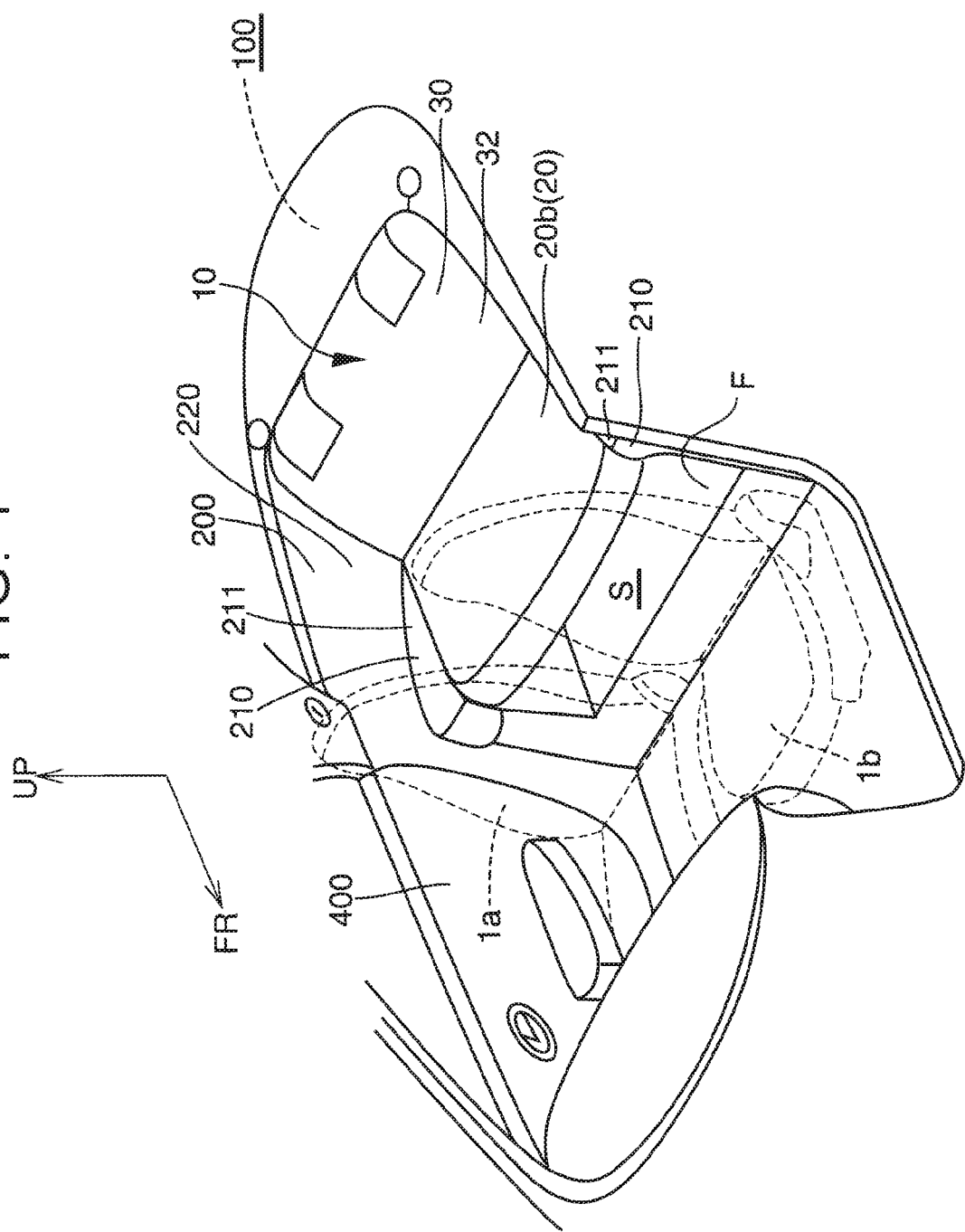
FIG. 1 is a schematic perspective view of a seat for a vehicle according to Embodiment 1 when a seat cushion is placed at a shelf position, and this figure is also applicable to Embodiment 2.
Figure 2:
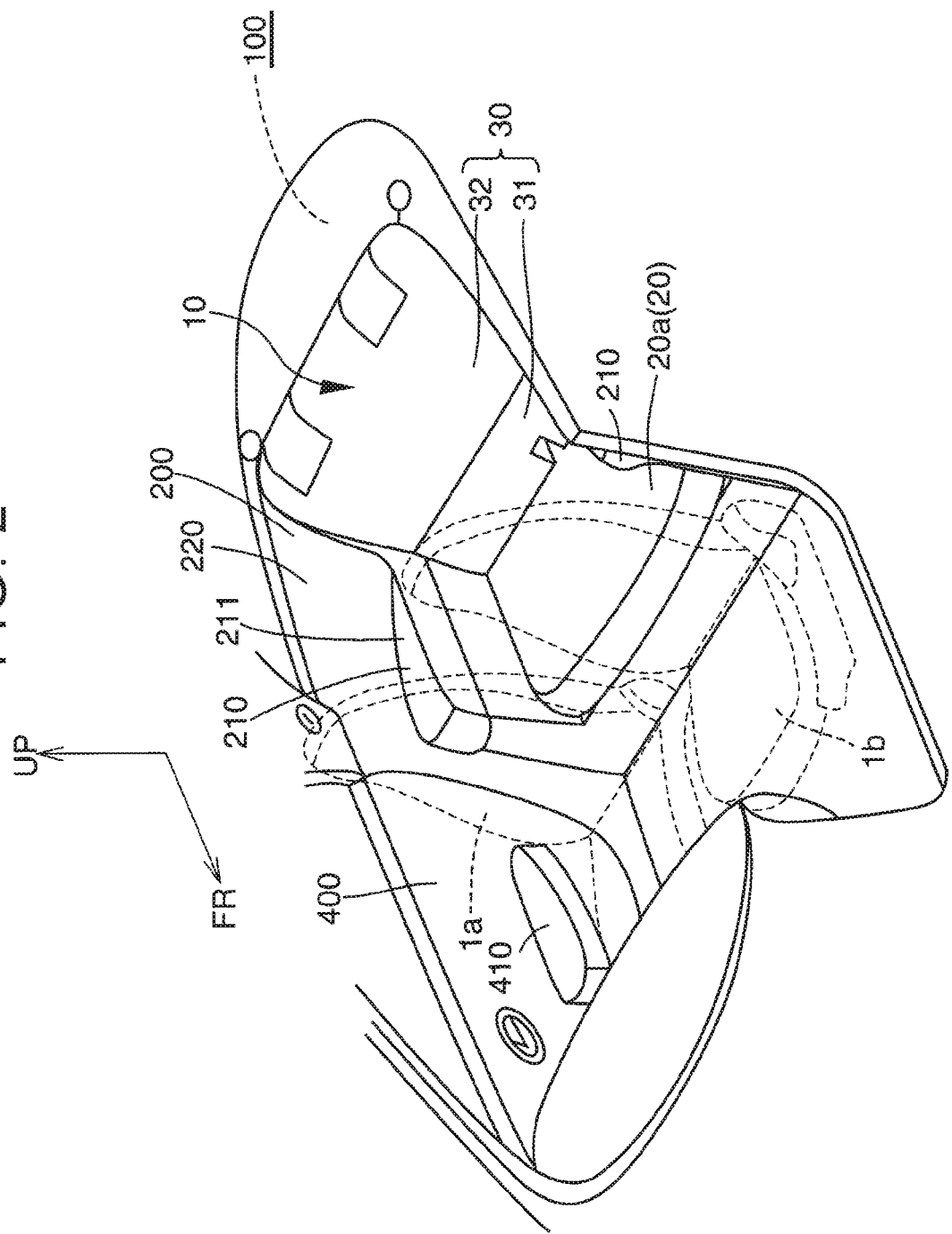
FIG. 2 is a schematic perspective view of the seat for the vehicle according to Embodiment 1 when the seat cushion is placed at a seat position, and this figure is also applicable to Embodiment 2.

FIGS. 1 to 5 illustrate a seat for a vehicle according to Embodiment 1, and FIGS. 6 to 15 illustrate a seat for a vehicle according to Embodiment 2. FIGS. 1 and 2 are applicable to Embodiment 2 as well as Embodiment 1. Note that, in the figures, FR indicates the front side (the front side in the vehicle front-rear direction), and UP indicates the upper side (the upper side in the vehicle height direction). A common part in Embodiment 1 and Embodiment 2 has the same reference sign. Although not illustrated herein, directions along the vehicle right-left direction (the vehicle width direction) may be indicated as the right side in the vehicle width direction and the left side in the vehicle width direction.

First, common parts in Embodiment 1 and Embodiment 2 will be described. The seat for the vehicle in each embodiment is not limited particularly but is used for a coupe-type vehicle, for example. The coupe-type vehicle is a vehicle in which a front seat constituted by a driver seat and a front passenger seat is mainly used by one or two occupants and is also usable as a four-seater vehicle by using a rear seat in some cases.

The seat 10 for the vehicle (hereinafter just referred to as the seat 10) in each embodiment is a rear seat provided behind (on the rear side in the vehicle front-rear direction from) a driver seat 1a and a front passenger seat 1b, as illustrated in FIGS. 1, 2. A luggage room 100 of the vehicle is provided behind the seat 10 in the vehicle front-rear direction. Right and left side walls 200, of the vehicle, that are placed on the outer sides of the seat 10 in the vehicle right-left direction are provided with arm rests 210 usable by an occupant seated in the seat 10. The arm rest 210 is provided in a deck-side trim 220 that is a component part of the side wall 200. Note that the luggage room 100 may be a trunk configured such that luggage is stored therein in the vehicle. In each embodiment, the trunk is an open-type trunk that communicates with a passenger cabin where the driver seat 1a, the front passenger seat 1b, and the seat 10 are placed. However, the disclosure is not limited to this. For example, the trunk may be a close-type trunk separated from the passenger cabin via a partition wall.

The seat 10 includes a seat cushion 20 and a seatback 30.

The seat cushion 20 may be an undivided-type seat cushion that is not divided in the vehicle right-left direction or may be a divided-type seat cushion that is divided into multiple pieces in the vehicle right-left direction. Further, the seatback 30 may be an undivided-type seatback that is not divided in the vehicle right-left direction or may be a divided-type seatback that is divided into multiple pieces in the vehicle right-left direction.

Figure 5:
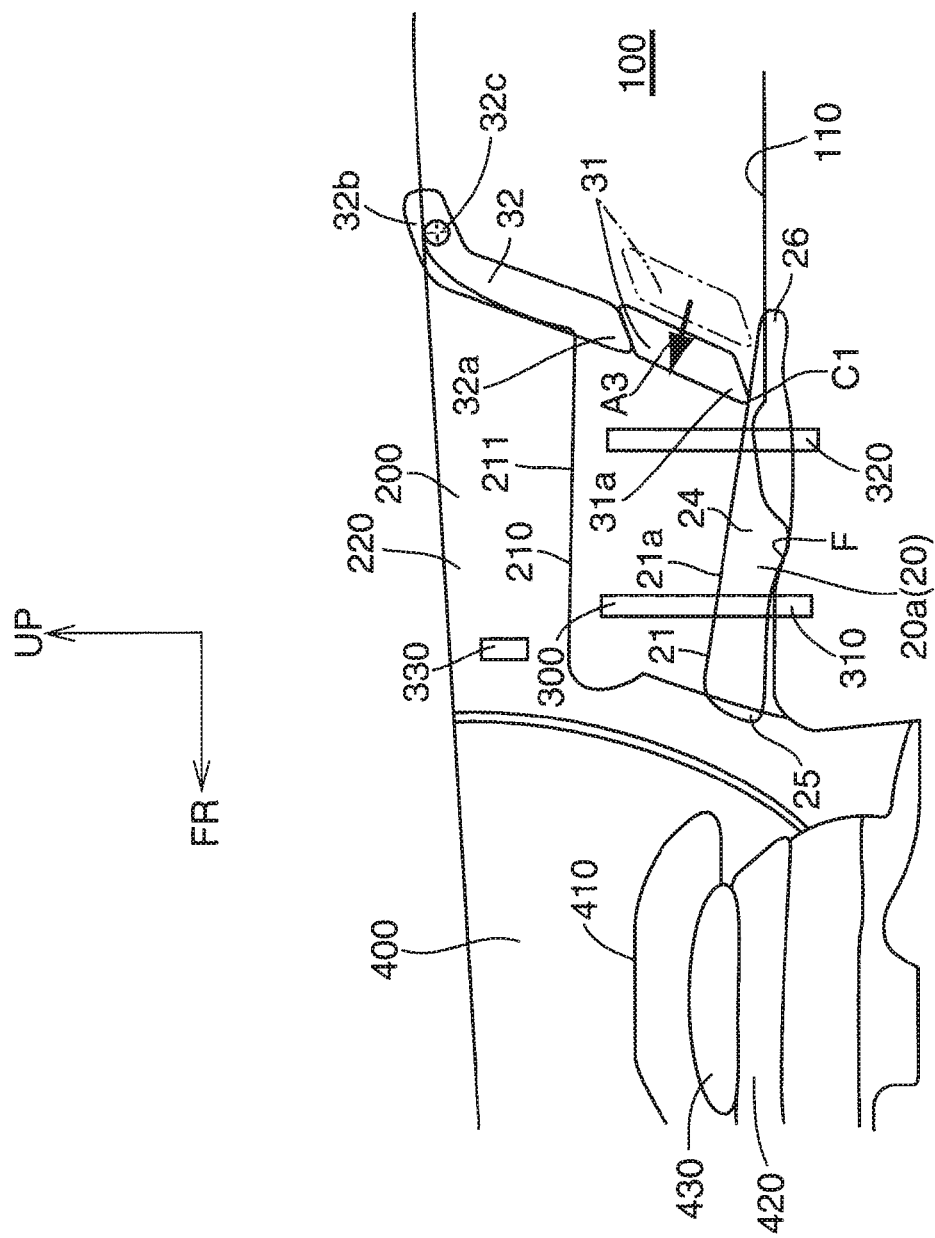
FIG. 5 is a schematic side view of the seat for the vehicle according to Embodiment 1 when the seat cushion is placed at the seat position.

As illustrated in FIG. 5, in the seat cushion 20, a top face 21 has an inclined surface 21a inclined rearward in the vehicle front-rear direction and downward in order to restrain an occupant from moving forward in the vehicle front-rear direction from the seat cushion 20 in case of a brakes operation and the like. The inclined surface 21a is provided over the whole or substantially whole top face 21 of the seat cushion 20 in the vehicle front-rear direction. Note that, in FIG. 5, a reference sign 400 indicates a front door trim, a reference sign 410 indicates a front door arm rest provided in the front door trim 400, a reference sign 420 indicates a console device provided between the driver seat 1a and the front passenger seat 1b, and a reference sign 430 indicates a console lid provided on the console device 420.

Figure 3:
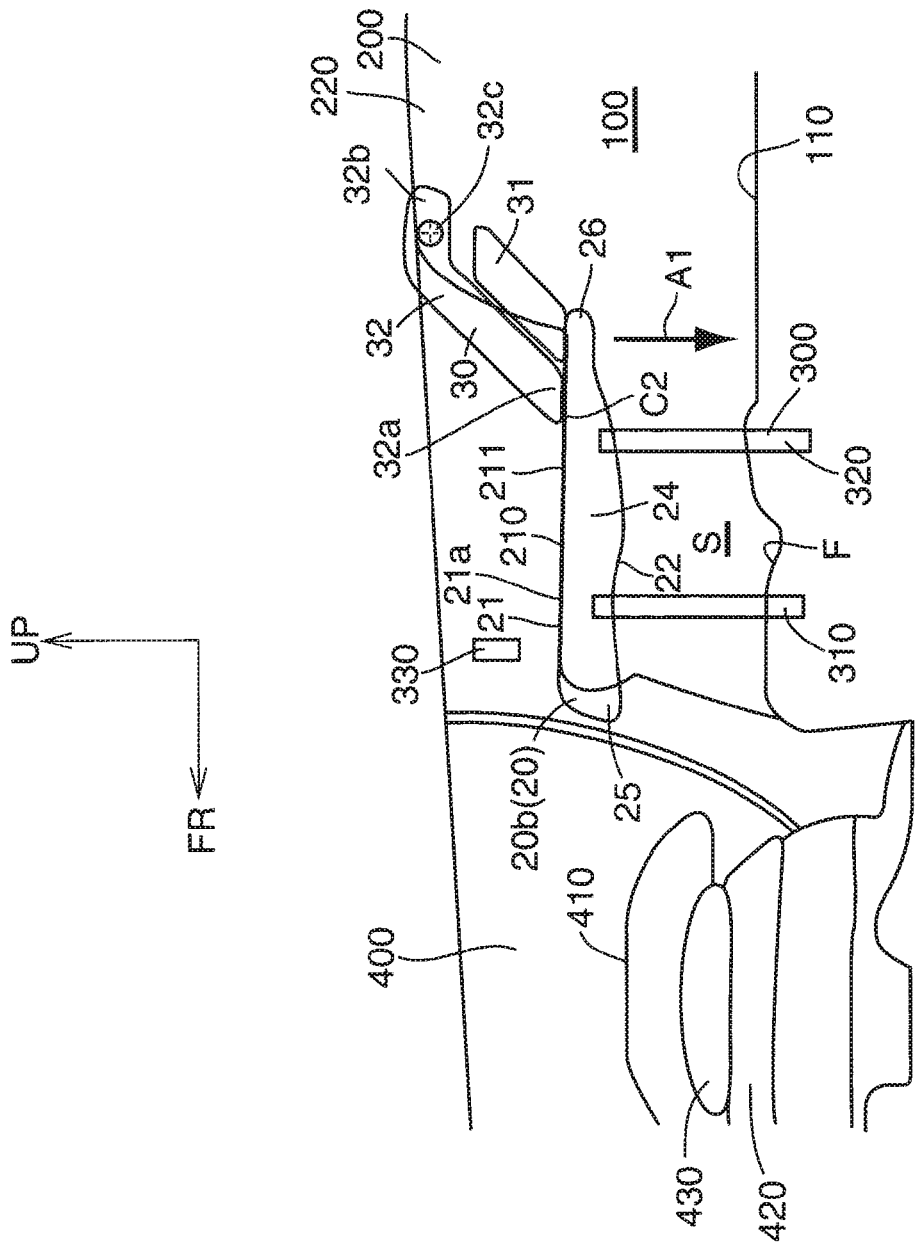
FIG. 3 is a schematic side view of the seat for the vehicle according to Embodiment 1 when the seat cushion is placed at the shelf position.
Figure 4:
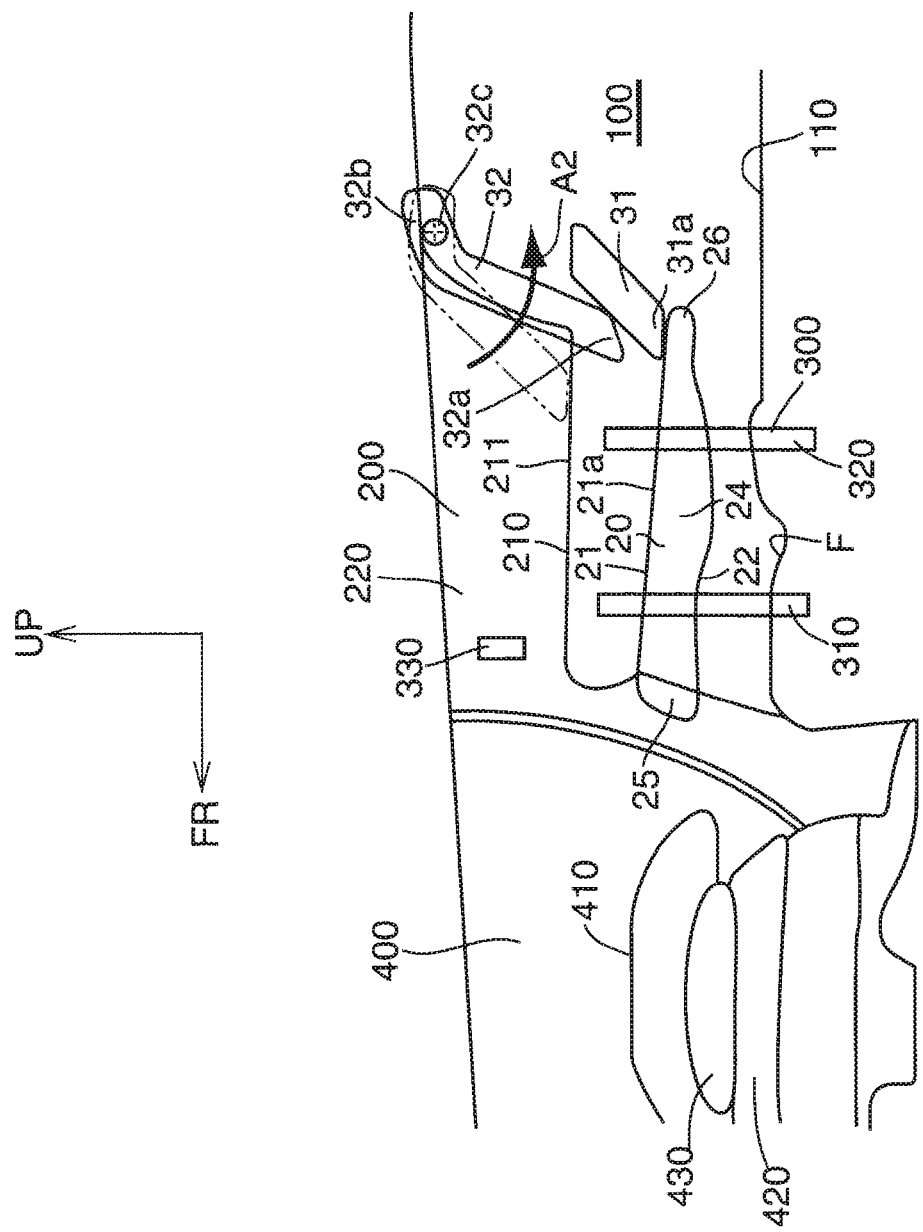
FIG. 4 is a schematic side view illustrating a middle state of the seat for the vehicle according to Embodiment 1 when the seat cushion moves from the shelf position to the seat position.

The seat cushion 20 is movable substantially in parallel in the vehicle up-down direction between a seat position 20a (see FIG. 5) at which an occupant can be seated in the seat cushion 20 and a shelf position 20b (see FIG. 3) moved upward from the seat position 20a. Note that the substantially parallel movement indicates that a front end 25 and a rear end 26 of the seat cushion 20 move in the same direction with substantially the same moving amount as illustrated in FIGS. 3 to 5 and the seat cushion 20 moves without causing an inclination angle of the inclined surface 21a of the seat cushion 20 from a horizontal plane to become larger than an inclination angle of the inclined surface 21a at the time when the seat cushion 20 is placed at the seat position 20a.

As illustrated in FIG. 5, when the seat cushion 20 is placed at the seat position 20a, the top face 21 of the seat cushion 20 is placed below a top face 211 of the arm rest 210. As illustrated in FIG. 3, when the seat cushion 20 is placed at the shelf position 20b, the top face 21 of the seat cushion 20 is placed substantially at the same height position as the top face 211 of the arm rest 210, so that the top face 211 of the arm rest 210 and the top face 21 of the seat cushion 20 can be used as one shelf surface.

When the seat cushion 20 is placed at the shelf position 20b, a space S is formed below the seat cushion 20, and the space S communicates with the luggage room 100 of the vehicle in the vehicle front-rear direction. The space S is a space between a bottom face 22 of the seat cushion 20 and a floor surface F, of the vehicle, that is placed vertically below the bottom face 22. The floor surface F is placed substantially at the same height as a floor surface 110 of the luggage room 100, so that the floor surface F and the floor surface 110 of the luggage room 100 can be used as one luggage loading surface.

When the seat cushion 20 moves from the seat position 20a to the shelf position 20b, the rear end 26 moves upward with a larger moving amount than that of the front end 25. On this account, when the seat cushion 20 is placed at the shelf position 20b, the inclined surface 21a of the seat cushion 20 is placed at an angle closer to a horizontal angle than the angle when the seat cushion 20 is placed at the seat position 20a.

The up-and-down movement of the seat cushion 20 may be performed electrically or may be performed manually. The seat cushion 20 may be provided with a projecting portion configured to project upward in the vehicle height direction. The seat cushion 20 and the seatback 30 may be in a body, and the seatback 30 may be the projecting portion of the seat cushion 20. The projecting portion may be configured to move relative to the seat cushion 20 in the vehicle height direction. The projecting portion may be configured to move relative to the seat cushion 20 in the vehicle front-rear direction. The projecting portion may be configured to project upward from the seat cushion 20 in the vehicle height direction when the seat cushion 20 is placed at the shelf position 20b. The projecting portion may be configured to be retracted into the seat cushion 20 when the seat cushion 20 is placed at the seat position 20a. A first position of the projecting portion may be placed forward of a second position of the projecting portion in the vehicle front-rear direction. The first position may be a position of the projecting portion when the seat cushion 20 is placed at the shelf position 20b. The second position may be a position of the projecting portion when the seat cushion 20 is placed at the seat position 20a.

The seatback 30 is usable as a backrest for an occupant. The seatback 30 includes a seatback lower 31 and a seatback upper 32 pivotable (including swinging) in the vehicle front-rear direction relative to the right and left side walls 200 of the vehicle. The seatback upper 32 includes a rotating shaft 32c in an upper end 32b and is pivotable in the vehicle front-rear direction around the rotating shaft 32c.

As illustrated in FIG. 5, when the seat cushion 20 is placed at the seat position 20a, the seatback lower 31 is placed below the seatback upper 32, and a lower end 31a makes contact with the top face 21 of the seat cushion 20. The seatback upper 32 is placed above the seatback lower 31.

As illustrated in FIG. 3, when the seat cushion 20 is placed at the shelf position 20b, the seatback lower 31 is placed behind the seatback upper 32 in the vehicle front-rear direction. The seatback upper 32 pivots relative to the side walls 200 of the vehicle so that a lower end 32a is placed forward in the vehicle front-rear direction in comparison with a case where the seat cushion 20 is placed at the seat position 20a, and the lower end 32a makes contact with the top face 21 of the seat cushion 20.

A contact position C2 (see FIG. 3) between the seatback 30 and the top face 21 of the seat cushion 20 when the seat cushion 20 is placed at the shelf position 20b is placed forward in the vehicle front-rear direction from a contact position C1 (see FIG. 5) between the seatback 30 and the top face 21 of the seat cushion 20 when the seat cushion 20 is placed at the seat position 20a. That is, the contact position C2 (see FIG. 3) between the lower end 32a of the seatback upper 32 and the top face 21 of the seat cushion 20 when the seat cushion 20 is placed at the shelf position 20b is placed forward in the vehicle front-rear direction from the contact position C1 (see FIG. 5) between the lower end 31a of the seatback lower 31 and the top face 21 of the seat cushion 20 when the seat cushion 20 is placed at the seat position 20a.

Common operations and effect in Embodiment 1 and Embodiment 2 will be described here. (A) The seat cushion 20 is movable between the seat position 20a and the shelf position 20b moved upward from the seat position 20a substantially in parallel, and therefore, when the seat cushion 20 is placed at the seat position 20a, the seat 10 for the vehicle can be used as a seat in which an occupant can be seated. Further, by moving the seat cushion 20 upward substantially in parallel so that the seat cushion 20 is placed at the shelf position 20b, the seat cushion 20 can be used as a shelf. Hereby, the seat 10 for the vehicle is usable effectively.

(B) When the seat cushion 20 of the seat 10 for the vehicle is placed at the shelf position 20b, an occupant seated in the front seat just substantially needs to horizontally stretch out the hand rearward in the vehicle front-rear direction to reach out for luggage put on the seat cushion 20 of the seat 10 for the vehicle. On this account, in comparison with a case where the occupant in the front seat stretches out the hand rearward in the vehicle front-rear direction and diagonally downward, a distance from the occupant in the front seat (the shoulder of the occupant) to the luggage becomes short, so that the occupant in the front seat can easily access the luggage put on the seat cushion 20 of the seat (rear seat) 10 for the vehicle.

(C) Since the space S below the seat cushion 20 communicates with the luggage room 100 in the vehicle front-rear direction, it is possible to store elongated luggage in the vehicle.

Note that, even in a case where the seatback 30 is tilted by being rotated around the lower end toward the seat cushion 20 side in a state where the seat cushion 20 is placed at the seat position 20a, if an upper space above the seatback 30 thus tilted communicates with the luggage room 100 in the vehicle front-rear direction, it is possible to store elongated luggage. However, in a case where the upper space above the seatback 30 thus tilted around the lower end is used, (i) in order to restrain a step from being formed between the seatback 30 and the floor surface 110 of the luggage room 100, it is necessary to raise the floor surface 110 of the luggage room 100 to the height of the top face of the seatback 30 thus tilted, thereby resulting in that a space in the luggage room 100 in the up-down direction is reduced. Further, (ii) since the elongated luggage is completely exposed to view from outside the vehicle, there is room for improvement in terms of security and outward appearance. In contrast, in the present embodiments, since the space S below the seat cushion 20 placed at the shelf position 20b communicates with the luggage room 100, no step is formed with respect to the floor surface 110 of the luggage room 100 or a step is formed to such an extent that the step can be ignored even without raising the floor surface 110 of the luggage room 100. Accordingly, it is possible to enlarge the space in the luggage room 100 in the up-down direction. Further, the elongated luggage can be hardly viewed from outside the vehicle due to the seat cushion 20, and thus, the present embodiments are advantageous in terms of security and outward appearance.

(D) When the seat cushion 20 is placed at the shelf position 20b, the inclined surface 21a of the top face 21 of the seat cushion 20 is placed at an angle closer to a horizontal angle than the angle when the seat cushion 20 is placed at the seat position 20a. Accordingly, (i) the luggage can hardly move rearward in the vehicle front-rear direction on the seat cushion 20. On this account, when the occupant in the front seat reaches out for the luggage put on the seat cushion 20 placed at the shelf position 20b of the seat 10 for the vehicle, the occupant can easily access the luggage. Further, (ii) a distance in the up-down direction between the rear end 26 of the seat cushion 20 placed at the shelf position 20b and the floor surface F can be made large.

(E) Since the contact position C2 between the seatback 30 and the top face 21 of the seat cushion when the seat cushion 20 is placed at the shelf position 20b is placed forward in the vehicle front-rear direction from the contact position C1 when the seat cushion 20 is placed at the seat position 20a, a distance by which the luggage put on the seat cushion 20 is movable rearwardly relative to the seat cushion 20 can be reduced. Accordingly, when the occupant in the front seat reaches out for the luggage put on the seat cushion 20 placed at the shelf position 20b, the occupant can easily access the luggage.

(F) When the seat cushion 20 is placed at the shelf position 20b, the seatback upper 32 pivots relative to the right and left side walls 200 of the vehicle so that the lower end 32a is placed forward in the vehicle front-rear direction in comparison with a case where the seat cushion 20 is placed at the seat position 20a, and the lower end 32a makes contact with the top face 21 of the seat cushion 20. On this account, the contact position C2 between the seatback 30 and the top face 21 of the seat cushion when the seat cushion 20 is placed at the shelf position 20b can be placed forward in the vehicle front-rear direction from the contact position C1 between the seatback 30 and the top face 21 of the seat cushion when the seat cushion 20 is placed at the seat position 20a. Accordingly, the distance by which the luggage put on the seat cushion 20 is movable rearwardly relative to the seat cushion 20 can be reduced. As a result, when the occupant in the front seat reaches out for the luggage put on the seat cushion 20 placed at the shelf position 20b, the occupant can easily access the luggage.

(G) When the seat cushion 20 is placed at the shelf position 20b, the seatback lower 31 is placed behind the seatback upper 32 in the vehicle front-rear direction, and the lower end 32a of the seatback upper 32 makes contact with the top face 21 of the seat cushion 20. Accordingly, in comparison with a case where the seatback 30 does not employ an up-down divided structure and the seatback 30 just rotates around the rotating shaft 32c so that the lower end moves forward in the vehicle front-rear direction relative to the right and left side walls 200 of the vehicle and the lower end makes contact with the top face 21 of the seat cushion 20, it is possible to restrain the contact position C2 between the seatback 30 and the top face 21 of the seat cushion from moving forward too much in the vehicle front-rear direction. Accordingly, it is possible to secure a relatively large depth, as a shelf, of the seat cushion 20 placed at the shelf position 20b.

(H) When the seat cushion 20 is placed at the shelf position 20b, the top face 21 of the seat cushion 20 is placed substantially at the same height position as the top face 211 of the arm rest 210. Accordingly, the top face 211 of the arm rest and the top face 21 of the seat cushion can be used as one shelf surface. This makes it possible to enlarge a luggage storage space in the vehicle right-left direction. Further, when the seat cushion 20 is placed at the seat position 20a, the top face 21 of the seat cushion is placed below the top face 211 of the arm rest, so that the occupant seated in the seat cushion 20 placed at the seat position 20a can use the arm rest 210 as an arm rest.

Next will be described parts characteristic to each embodiment of the disclosure.

Embodiment 1

Embodiment 1 shows a case where the up-and-down movement of the seat cushion 20 is performed electrically.

As illustrated in FIGS. 3 to 5, the seat cushion 20 is supported by a sliding mechanism 300 provided in the deck-side trim 220 so that the seat cushion 20 is movable in the up-down direction. The sliding mechanism 300 includes a pair of front movable rails 310 and a pair of rear movable rails 320. The front movable rails 310 are provided ahead of a center 24 of the seat cushion 20 in the vehicle front-rear direction so as to be placed on the outer sides of the seat cushion 20 in the vehicle right-left direction. The front movable rails 310 are provided so as to extend in the up-down direction. The rear movable rails 320 are provided behind the center 24 of the seat cushion 20 in the vehicle front-rear direction so as to be placed on the outer sides of the seat cushion 20 in the vehicle right-left direction. The rear movable rails 320 are provided so as to extend in the up-down direction.

All the movable rails 310, 320 are provided with ball screws (not shown). When the ball screws are moved by the movement of a motor (not shown), the seat cushion 20 can be moved up and down. Note that the deck-side trim 220 or the like is provided with an operation switch 330 configured to operate the motor (not shown).

The seatback lower 31 is supported by the seat cushion 20 so as to be movable in the vehicle front-rear direction. The seatback upper 32 is supported by the side walls 200 so as to be pivotable in the vehicle front-rear direction in such a manner that the rotating shaft 32c provided in the upper end 32b is supported by the side walls 200 of the vehicle in a pivotable manner.

Here, the operation of Embodiment 1 will be described.
(a) When the seat cushion 20 is placed at the shelf position 20b, the seatback lower 31 is placed behind the seatback upper 32 in the vehicle front-rear direction as illustrated in FIG. 3. In the seatback upper 32, the lower end 32a makes contact with the top face 21 of the seat cushion 20.

(b) When the seat cushion 20 is moved from the shelf position 20b to the seat position 20a, the operation switch 330 is kept operated (push operation), so that the seat cushion supported by the sliding mechanism 300 is moved down in an A1 direction in FIG. 3 until the seat cushion 20 reaches the seat position 20a. When the seat cushion 20 moves down, the seatback lower 31 supported by the seat cushion 20 also moves down together. The seatback upper 32 pivots by self-weight in a direction (an A2 direction in FIG. 4) where the lower end 32a moves rearward in the vehicle front-rear direction and downward until the seatback upper 32 abuts with a stopper (not shown).

When the seat cushion 20 completely reaches the seat position 20a, the seatback lower 31 is pulled out forward in the vehicle front-rear direction (an A3 direction in FIG. 5) by hand relative to the seat cushion 20, so that a front face of the seatback lower 31 in the vehicle front-rear direction is flush or substantially flush with a front face of the seatback upper 32 in the vehicle front-rear direction.

(c) When the seat cushion 20 is placed at the seat position 20a, the seatback lower 31 is placed below the seatback upper 32 as illustrated in FIG. 5. The front face of the seatback lower 31 in the vehicle front-rear direction is flush or substantially flush with the front face of the seatback upper 32 in the vehicle front-rear direction. In the seatback lower 31, the lower end 31a makes contact with the top face 21 of the seat cushion 20. The contact position C1 between the seatback lower 31 and the top face 21 of the seat cushion is placed rearward in the vehicle front-rear direction from the contact position C2 between the seatback upper 32 and the top face 21 of the seat cushion when the seat cushion 20 is placed at the shelf position 20b.

(d) When the seat cushion 20 is moved from the seat position 20a to the shelf position 20b, the seatback lower 31 is moved by being pushed rearward in the vehicle front-rear direction (a reverse A3 direction in FIG. 5) by hand relative to the seat cushion 20. After that, as illustrated in FIG. 4, the operation switch 330 is kept operated (push operation) so that the seat cushion 20 supported by the sliding mechanism 300 is moved up until the seat cushion 20 reaches the shelf position 20b. When the seat cushion 20 moves up, the seatback lower 31 supported by the seat cushion 20 also moves up together. When the seat cushion 20 moves up, the seatback upper 32 is pushed by the seatback lower 31, so that the lower end 32a pivots forward in the vehicle front-rear direction and in a direction (a reverse A2 direction in FIG. 4) where the lower end 32a moves upward. When the seat cushion 20 completely reaches the shelf position 20b, the above state (a) is established.

Next will be described the effects of Embodiment 1. In Embodiment 1, since the up-and-down movement of the seat cushion 20 is performed electrically, the up-and-down movement of the seat cushion 20 can be performed easily in comparison with a case where the up-and-down movement of the seat cushion 20 is performed manually. Further, sense of quality can be given to the up-and-down movement of the seat cushion 20.

Embodiment 2

Embodiment 2 shows a case where the up-and-down movement of the seat cushion 20 is performed manually.

As illustrated in FIGS. 6 to 9, the seat cushion 20 is supported by the sliding mechanism 300 provided in the deck-side trim 220 so that the seat cushion 20 is slidable in the up-down direction. The sliding mechanism 300 includes a pair of front slide rails 311 and a pair of rear slide rails 321. The front slide rails 311 are provided ahead of the center 24 of the seat cushion 20 in the vehicle front-rear direction so as to be placed on the outer sides of the seat cushion 20 in the vehicle right-left direction. The front slide rails 311 are provided so as to extend in the up-down direction. The rear slide rails 321 are provided behind the center 24 of the seat cushion 20 in the vehicle front-rear direction so as to be placed on the outer sides of the seat cushion 20 in the vehicle right-left direction. The rear slide rails 321 are provided so as to extend in the up-down direction.

As illustrated in FIGS. 10 to 13, sliders 340 attached to the seat cushion 20 are supported by the slide rails 311, 321 such that the sliders 340 are slidable in the up-down direction. A pin 342 attached to an end portion of a wire 341 is supported by the slider 340 so as to be projectable from the slider 340, and the pin 342 is always biased by a pin biasing spring 343 in a direction to project from the slider 340.

Figure 13:
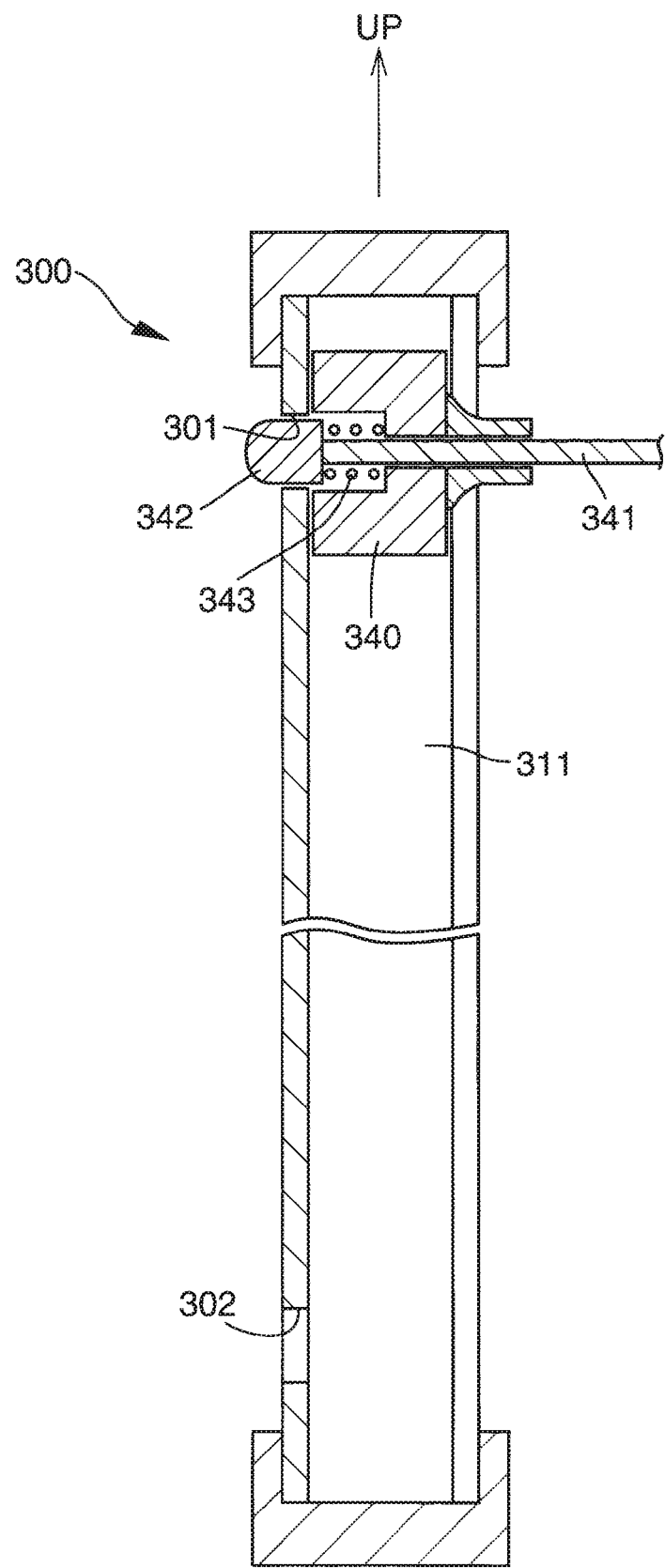
FIG. 13 is a sectional view of a line XIII-XIII in FIG. 12.

As illustrated in FIG. 13, each of the slide rails 311, 321 has an upper pin receiving hole 301 into which the pin 342 is inserted when the seat cushion 20 is placed at the shelf position 20b and a lower pin receiving hole 302 into which the pin 342 is inserted when the seat cushion 20 is placed at the seat position 20a. When the pin 342 is inserted into the upper pin receiving hole 301, the up-and-down movement of the slider 340 is restricted, so that the seat cushion 20 to which the slider 340 is attached is held at the shelf position 20b. Further, when the pin 342 is inserted into the lower pin receiving hole 302, the up-and-down movement of the slider 340 is restricted, so that the seat cushion 20 to which the slider 340 is attached is held at the seat position 20a.

The wire 341 is arranged on a bottom face 22 of the seat cushion 20, for example, and is connected to an operating lever (not shown) provided in or near a front end of the seat cushion 20 in the vehicle front-rear direction. When the wire 341 is drawn in by operating (pulling operation) the operating lever, the pin 342 is drawn in toward the slider 340 side against the biasing force of the pin biasing spring 343. When the pin 342 is drawn in, the pin 342 comes out from the upper pin receiving hole 301 or the lower pin receiving hole 302, so that the slider 340 and the seat cushion 20 to which the slider 340 is attached are movable up and down.

Note that, as illustrated in FIGS. 6 to 9, in order to reduce a lifting force required when the seat cushion 20 is moved upward from the seat position 20a to the shelf position 20b, the seat cushion 20 is provided with a helper spring 350. The helper spring 350 is a coil spring, for example, and is configured such that a first end is engaged with the seat cushion 20 and a second end is engaged with the side wall 200 of the vehicle.

Figure 14:
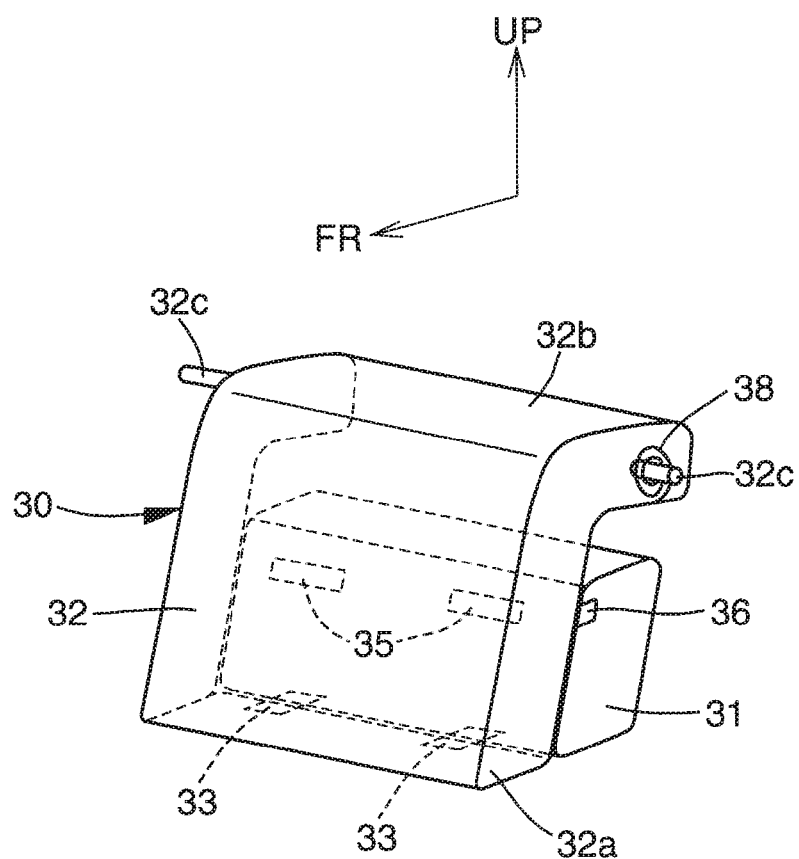
FIG. 14 is a perspective view of the seatback in the seat for the vehicle according to Embodiment 2 when the seatback lower is placed behind the seatback upper in the vehicle front-rear direction.
Figure 15:
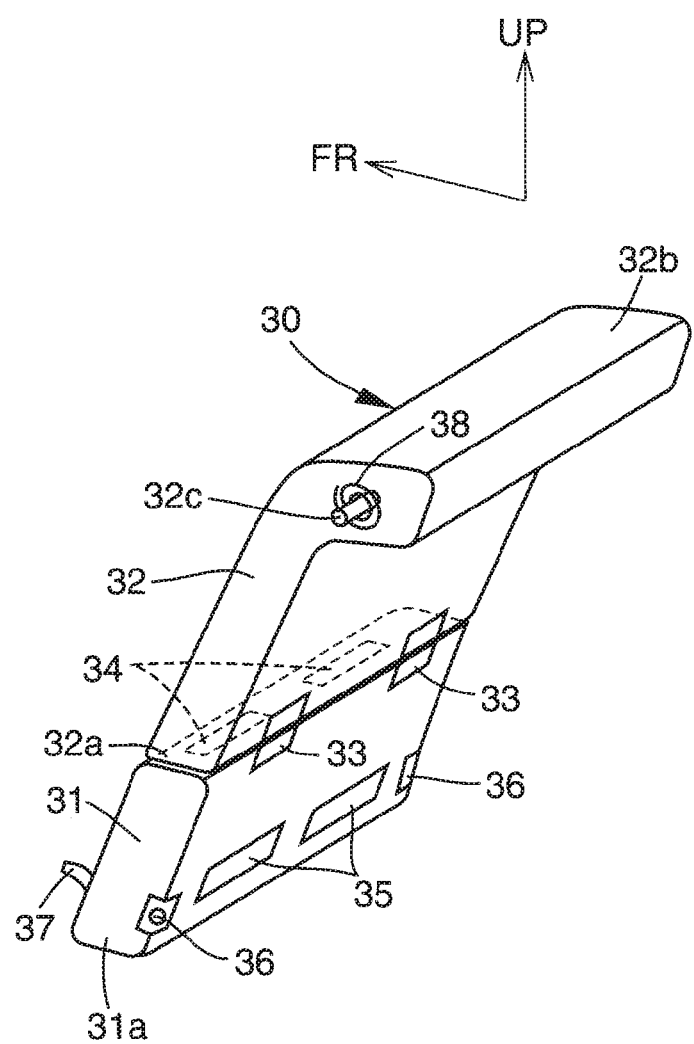
FIG. 15 is a perspective view of the seatback in the seat for the vehicle according to Embodiment 2 when the seatback lower is placed below the seatback upper.

As illustrated in FIGS. 14, 15, the seatback lower 31 is pivotably attached to the lower end 32a of the seatback upper 32 with hinges 33. When the seatback lower 31 is placed below the seatback upper 32, the seatback lower 31 is fixed to the seatback upper 32 with a first hook-and-loop fastener 34, and when the seatback lower 31 is placed behind the seatback upper 32, the seatback lower 31 is fixed to the seatback upper 32 with a second hook-and-loop fastener 35. When the seatback lower 31 is placed below the seatback upper 32, the front face of the seatback lower 31 in the vehicle front-rear direction is flush or substantially flush with the front face of the seatback upper 32 in the vehicle front-rear direction.

A seatback lock 36 configured to fix the seatback lower 31 to the side wall 200 of the vehicle or a floor wall of the vehicle is provided in the lower end 31a of the seatback lower 31 when the seatback lower 31 is placed below the seatback upper 32. Further, the seatback lower 31 is provided with an unlock strap 37 configured to unlock the seatback lock 36.

The seatback upper 32 is provided with a spiral spring 38 configured to pivotably bias the seatback upper 32 relative to the side wall 200 of the vehicle around the rotating shaft 32c in a direction where the lower end 32a moves forward in the vehicle front-rear direction and upward. The spiral spring 38 is configured such that a first end is engaged with the side wall 200 of the vehicle and a second end is engaged with the seatback upper 32. The seatback upper 32 pivots forward in the vehicle front-rear direction and upward by the biasing force of the spiral spring 38 until the seatback upper 32 abuts with a stopper (not shown).

Figure 6:
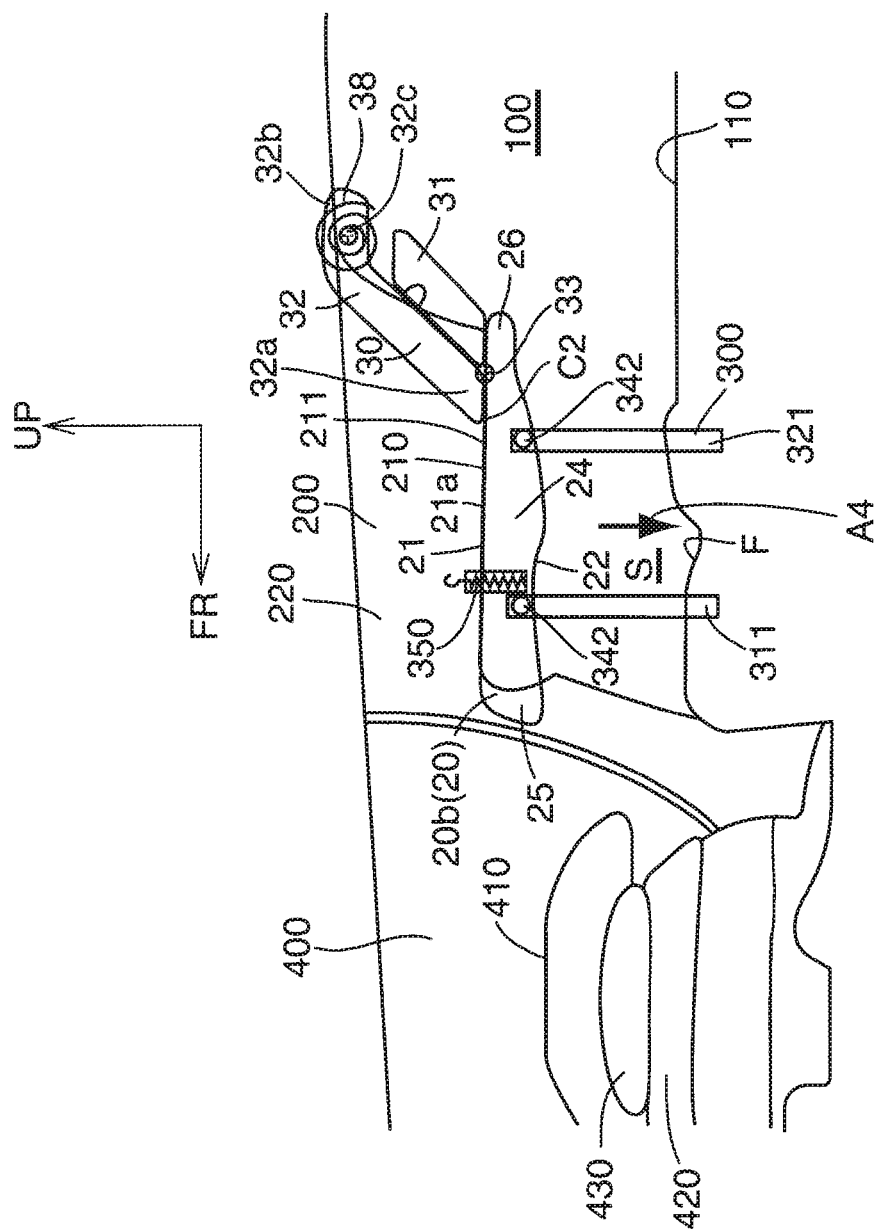
FIG. 6 is a schematic side view of a seat for a vehicle according to Embodiment 2 when the seat cushion is placed at the shelf position.

Here, the operation in Embodiment 2 will be described.
(a) When the seat cushion 20 is placed at the shelf position 20b, the pin 342 is inserted into the upper pin receiving hole 301, so that the seat cushion 20 is held at the shelf position 20b, as illustrated in FIGS. 6, 13. The seatback lower 31 is placed behind the seatback upper 32 in the vehicle front-rear direction and is fixed to the seatback upper 32 with the second hook-and-loop fastener 35. In the seatback upper 32, the lower end 32a makes contact with the top face 21 of the seat cushion 20.

Figure 7:
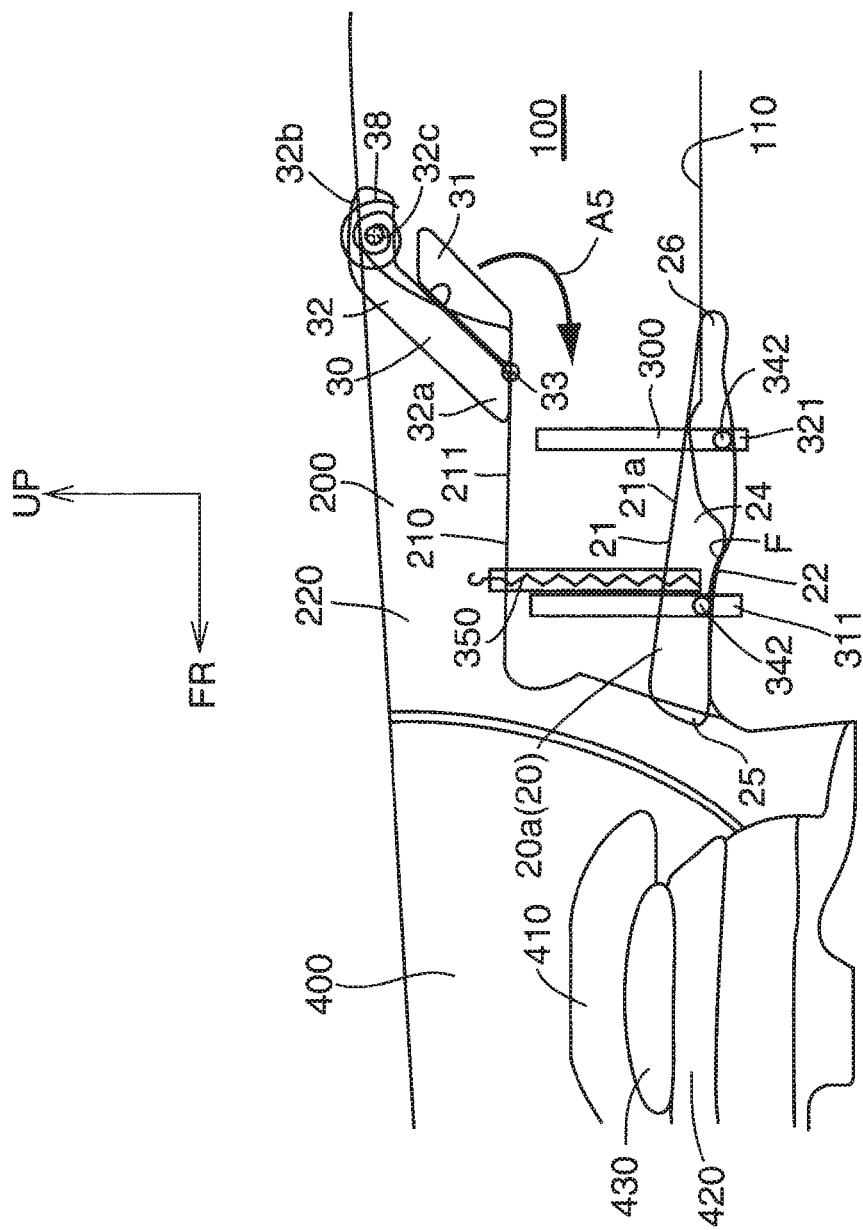
FIG. 7 is a schematic side view of the seat for the vehicle according to Embodiment 2 when the seat cushion is moved from the shelf position to the seat position in a state where a seatback lower is placed behind a seatback upper in the vehicle front-rear direction.

(b) When the seat cushion 20 is moved from the shelf position 20b to the seat position 20a, the wire 341 is drawn in by operating (pulling operation) the operating lever (not shown), so that the pin 342 is pulled out of the upper pin receiving hole 301. Then, the seat cushion 20 is pressed downward (an A4 direction in FIG. 6) by hand. As illustrated in FIG. 7, when the seat cushion 20 is pressed down until the pin 342 reaches the lower pin receiving hole 302, the pin 342 is inserted into the lower pin receiving hole 302, so that the seat cushion 20 is held at the seat position 20a.

Figure 8:
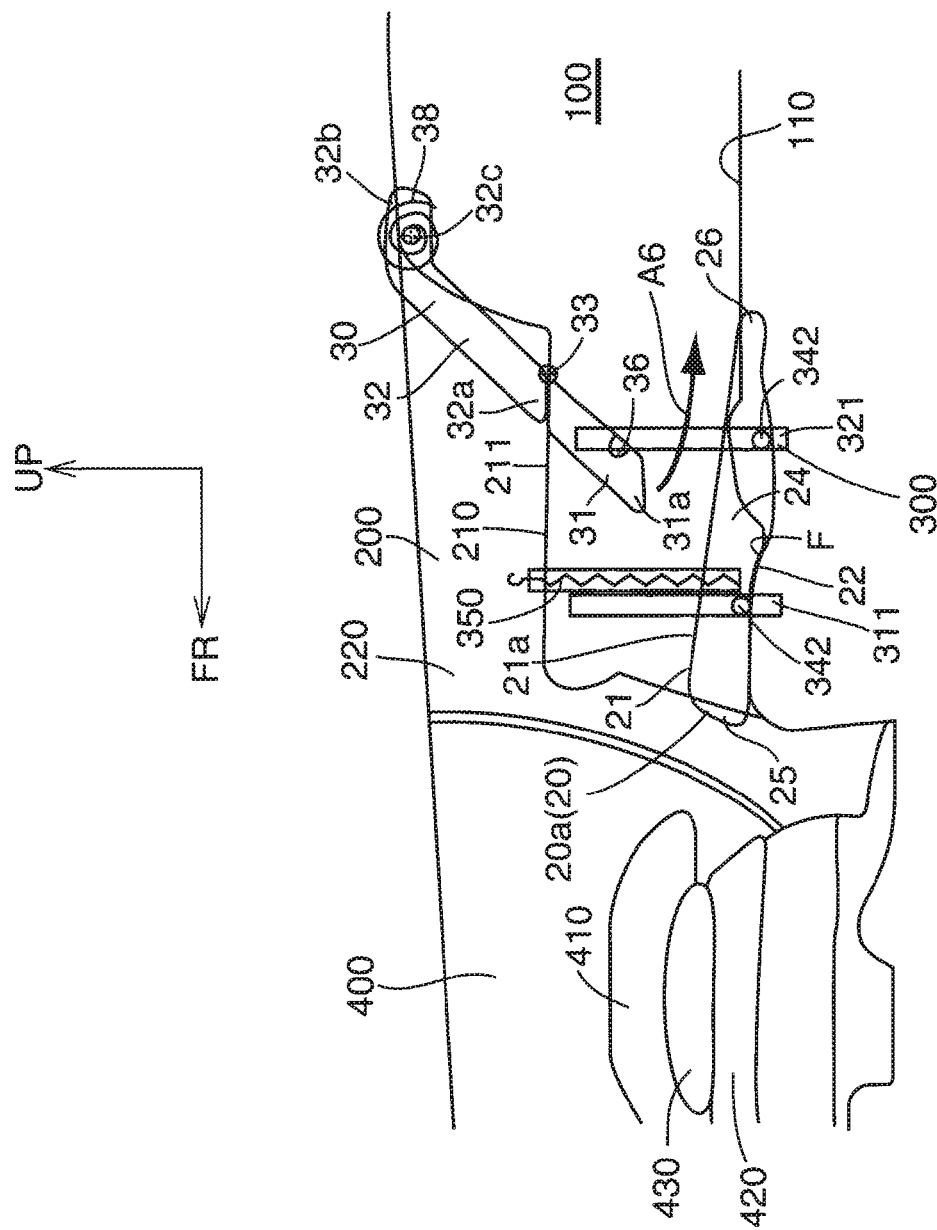
FIG. 8 is a schematic side view of the seat for the vehicle according to Embodiment 2 when the seatback lower is moved to below the seatback upper from the state of FIG. 7.

After that, the seatback lower 31 is taken off from the second hook-and-loop fastener 35 and is pivoted downward (an A5 direction in FIG. 7) relative to the seatback upper 32. As illustrated in FIG. 8, when the seatback lower 31 is pivoted to below the seatback upper 32, the seatback lower 31 is fixed to the seatback upper 32 with the first hook-and-loop fastener 34.

After that, in a state where the seatback lower 31 is fixed to the seatback upper 32 with the first hook-and-loop fastener 34, the seatback 30 is pressed rearward in the vehicle front-rear direction (an A6 direction in FIG. 8) against the biasing force of the spiral spring 38, and the seatback lock 36 is locked, so that the seatback 30 is fixed to the side wall 200 of the vehicle or the floor wall of the vehicle. When the seatback lock 36 is locked, the state where the seatback 30 is pressed rearward in the vehicle front-rear direction against the biasing force of the spiral spring 38 is maintained.

Figure 9:
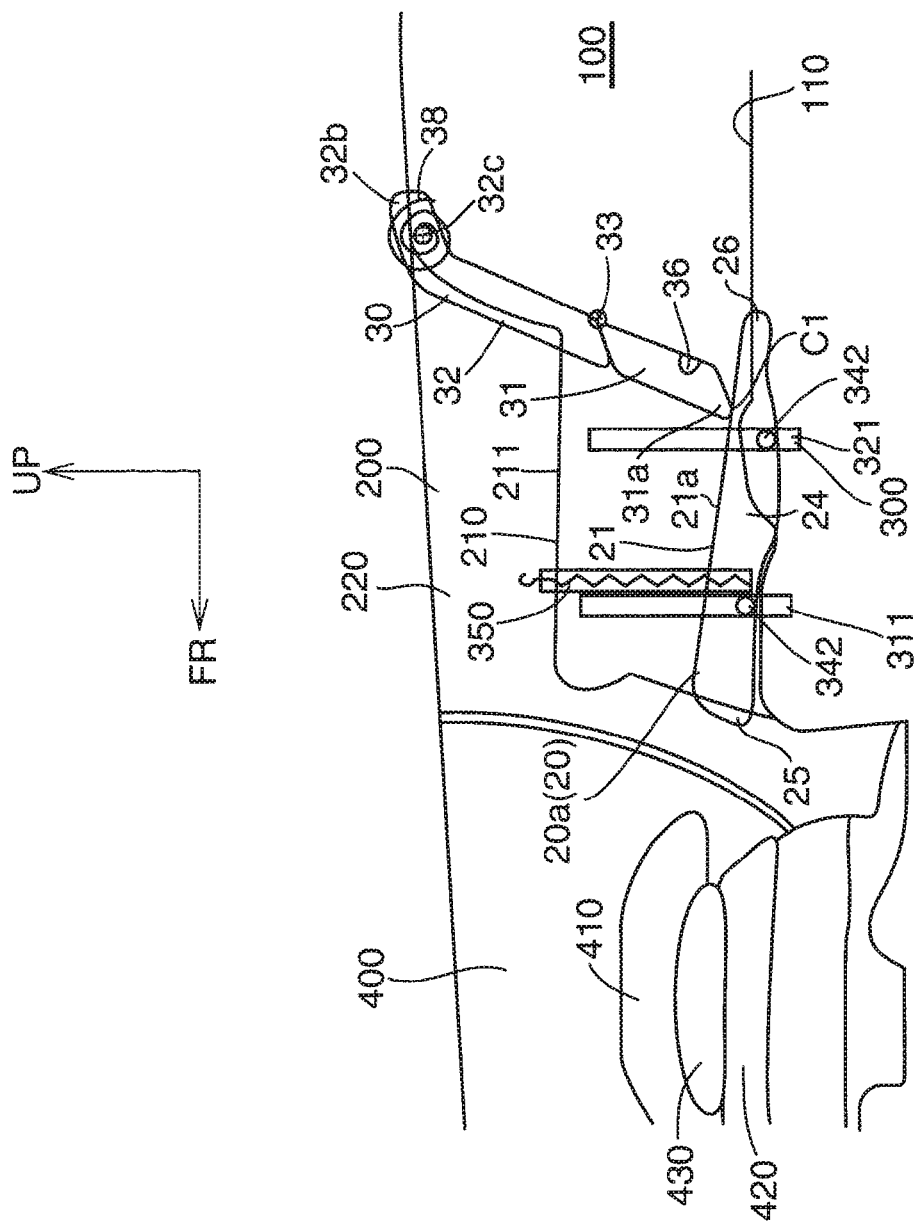
FIG. 9 is a schematic side view of the seat for the vehicle according to Embodiment 2 when the seat cushion is placed at the seat position.
Figure 10:
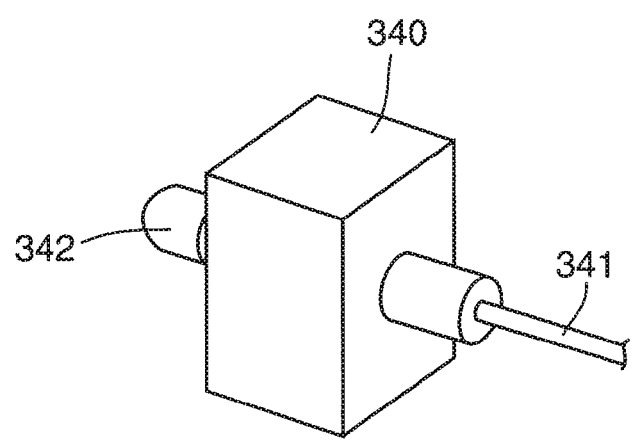
FIG. 10 is a perspective view of a pin used in a sliding mechanism in the seat for the vehicle according to Embodiment 2.
Figure 11:
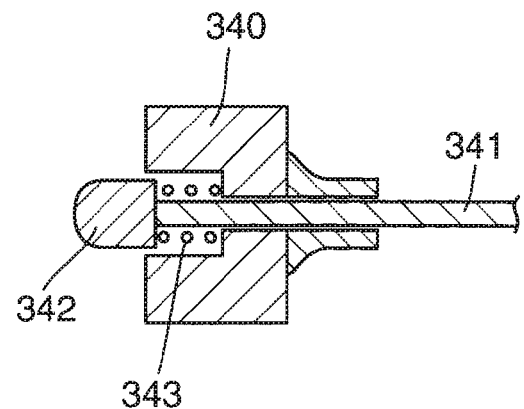
FIG. 11 is a sectional view of the pin used in the sliding mechanism in the seat for the vehicle according to Embodiment 2.
Figure 12:
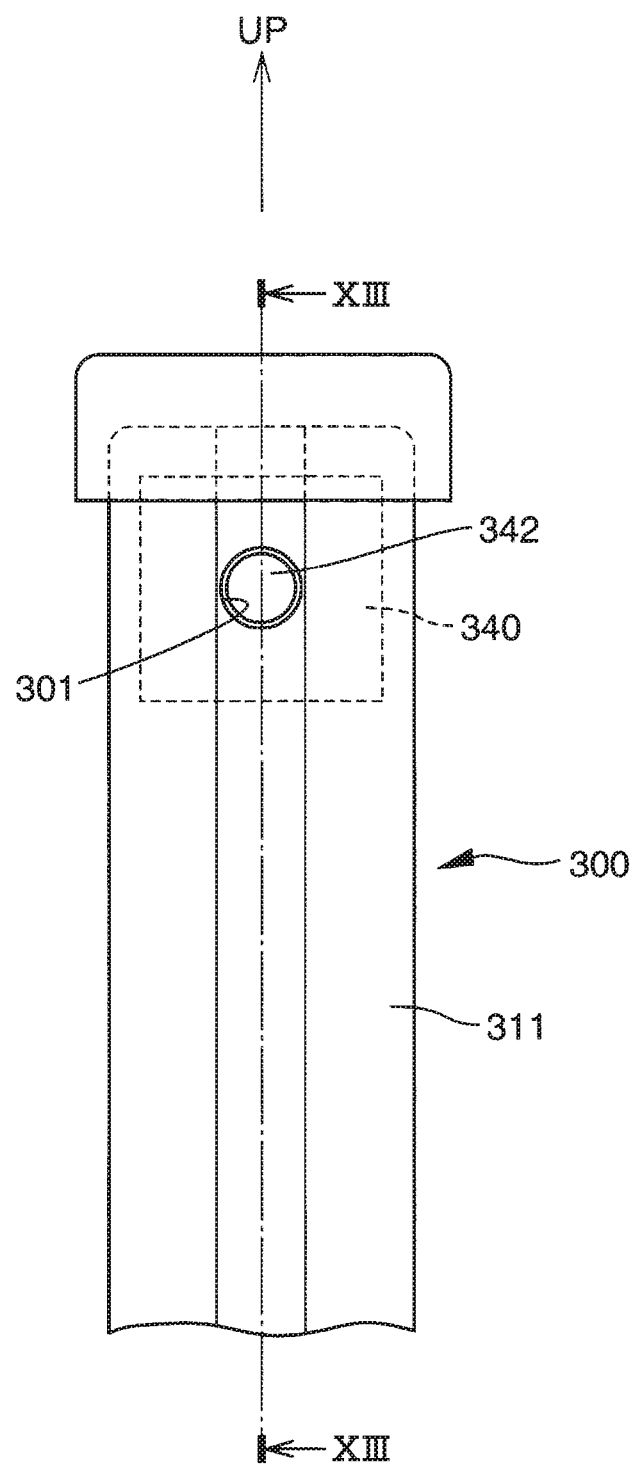
FIG. 12 is a fragmentary front view of the pin and a slide rail used in the sliding mechanism in the seat for the vehicle according to Embodiment 2.

(c) When the seat cushion 20 is placed at the seat position 20a, the pin 342 is inserted into the lower pin receiving hole 302, so that the seat cushion 20 is held at the seat position 20a, as illustrated in FIG. 9. The seatback lower 31 is placed below the seatback upper 32 and is fixed to the seatback upper 32 with the first hook-and-loop fastener 34. In the seatback lower 31, the lower end 31a makes contact with the top face 21 of the seat cushion 20. The contact position C1 between the seatback lower 31 and the top face 21 of the seat cushion is placed rearward in the vehicle front-rear direction from the contact position C2 between the seatback upper 32 and the top face 21 of the seat cushion 20 when the seat cushion 20 is placed at the shelf position 20b.

(d) When the seat cushion 20 is moved from the seat position 20a to the shelf position 20b, the unlock strap 37 is operated (pulling operation) so as to unlock the seatback lock 36. As illustrated in FIG. 8, when the seatback lock 36 is unlocked, the seatback 30 pivots forward in the vehicle front-rear direction (a reverse A6 direction in FIG. 8) by the biasing force of the spiral spring 38 until the seatback 30 abuts with the stopper (not shown).

After that, as illustrated in FIG. 7, the seatback lower 31 is taken off from the first hook-and-loop fastener 34 and is pivoted rearward in the vehicle front-rear direction (a reverse A5 direction in FIG. 7) relative to the seatback upper 32. When the seatback lower 31 is pivoted to behind the seatback upper 32, the seatback lower 31 is fixed to the seatback upper 32 with the second hook-and-loop fastener 35.

After that, the wire 341 is drawn in by operating (pulling operation) the operating lever (not shown), so that the pin 342 is pulled out of the lower pin receiving hole 302. Then, as illustrated in FIG. 6, the seat cushion 20 is lifted upward (a reverse A4 direction in FIG. 6) by hand by use of the biasing force of the helper spring 350. When the seat cushion 20 is lifted upward until the pin 342 reaches the upper pin receiving hole 301, the pin 342 is inserted into the upper pin receiving hole 301, so that the seat cushion 20 is held at the shelf position 20b. When the seat cushion 20 is held at the shelf position 20b, the above state (a) is established.

Next will be described the effects of Embodiment 2. In Embodiment 2, since the up-and-down movement of the seat cushion 20 is performed manually, the configuration of Embodiment 2 is achievable at a low cost in comparison with a case where the up-and-down movement of the seat cushion 20 is performed electrically.

Further, since the helper spring 350 is provided, even in the case where the up-and-down movement of the seat cushion 20 is performed manually, the biasing force of the helper spring 350 can be used at the time when the seat cushion 20 is moved from the seat position 20a to the shelf position 20b, thereby making it possible to easily move the seat cushion (with a relatively light force).

What is claimed is:

1. A seat for a vehicle, the seat comprising:
    a seat cushion configured to move between a seat position at which an occupant to be seated in the seat cushion and a shelf position moved upward from the seat position substantially in parallel; and
    a seatback including:
        a seatback lower; and
        a seatback upper configured to pivot in a vehicle front-rear direction relative to right and left side walls of the vehicle,
    when the seat cushion is placed at the seat position, a lower end of the seatback lower makes contact with a top face of the seat cushion, and the seatback upper is placed above the seatback lower; and
    when the seat cushion is placed at the shelf position, the seatback lower is placed behind the seatback upper in the vehicle front-rear direction, the seatback upper pivots relative to the side walls of the vehicle so that a lower end of the seatback upper is placed forward in the vehicle front-rear direction in comparison with a case where the seat cushion is placed at the seat position, and the lower end makes contact with the top face of the seat cushion.

2. The seat for the vehicle according to claim 1, wherein:
    when the seat cushion is placed at the shelf position, a space is formed between the seat cushion and a floor surface of the vehicle, the floor surface being placed below the seat cushion; and
    the space communicates with a luggage room of the vehicle in a vehicle front-rear direction.

3. The seat for the vehicle according to claim 1, wherein:
    a top face of the seat cushion includes an inclined surface inclined rearward in a vehicle front-rear direction and downward in a vehicle height direction when the seat cushion is placed at the seat position; and
    an angle between the inclined surface and a horizontal plane when the seat cushion is placed at the shelf position is smaller than an angle between the inclined surface and the horizontal plane when the seat cushion is placed at the seat position.

4. The seat for the vehicle according to claim 1, wherein a contact position between the seatback and a top face of the seat cushion when the seat cushion is placed at the shelf position is placed forward in a vehicle front-rear direction from a contact position between the seatback and the top face of the seat cushion when the seat cushion is placed at the seat position.

5. The seat for the vehicle according to claim 1, wherein:
    at least one of right and left side walls of the vehicle is provided with an arm rest to be used by an occupant seated in the seat cushion placed at the seat position, the right and left side walls being placed on outer sides of the seat in a vehicle right-left direction;
    when the seat cushion is placed at the seat position, a top face of the seat cushion is placed below a top face of the arm rest; and
    when the seat cushion is placed at the shelf position, the top face of the seat cushion is placed substantially at the same height as the top face of the arm rest in a vehicle height direction.

6. The seat for the vehicle according to claim 1, wherein a movement of the seat cushion in a vehicle height direction is performed electrically.

7. The seat for the vehicle according to claim 1, wherein a movement of the seat cushion in a vehicle height direction is performed manually.

8. The seat for the vehicle according to claim 7, wherein the seat cushion is provided with a helper spring configured to bias the seat cushion upward.

9. The seat for the vehicle according to claim 1, wherein the seat cushion is provided with a projecting portion configured to project upward in a vehicle height direction.

10. The seat for the vehicle according to claim 9, wherein a first position of the projecting portion is placed forward of a second position of the projecting portion in a vehicle front-rear direction, the first position being a position of the projecting portion when the seat cushion is placed at the shelf position, and the second position being a position of the projecting portion when the seat cushion is placed at the seat position.

11. A seat for a vehicle, the seat comprising:
   a seat cushion configured to move between a seat position at which an occupant to be seated in the seat cushion and a shelf position moved upward from the seat position substantially in parallel,
   wherein:
      a top face of the seat cushion includes an inclined surface inclined rearward in a vehicle front-rear direction and downward in a vehicle height direction when the seat cushion is placed at the seat position; and
      an angle between the inclined surface and a horizontal plane when the seat cushion is placed at the shelf position is smaller than an angle between the inclined surface and the horizontal plane when the seat cushion is placed at the seat position.

12. The seat for the vehicle according to claim 11, further comprising a seatback.

13. The seat for the vehicle according to claim 12, wherein:
   when the seat cushion is placed at the shelf position, a space is formed between the seat cushion and a floor surface of the vehicle, the floor surface being placed below the seat cushion; and
   the space communicates with a luggage room of the vehicle in a vehicle front-rear direction.

14. The seat for the vehicle according to claim 12, wherein a contact position between the seatback and a top face of the seat cushion when the seat cushion is placed at the shelf position is placed forward in a vehicle front-rear direction from a contact position between the seatback and the top face of the seat cushion when the seat cushion is placed at the seat position.

15. A seat for a vehicle, the seat comprising:
   a seat cushion configured to move between a seat position at which an occupant to be seated in the seat cushion and a shelf position moved upward from the seat position substantially in parallel; and
   a seatback,
   wherein a contact position between the seatback and a top face of the seat cushion when the seat cushion is in the shelf position is located more forward in a vehicle front-rear direction than a contact position between the seatback and the top face of the seat cushion when the seat cushion is in the seat position.

16. The seat for the vehicle according to claim 15, wherein:
   when the seat cushion is placed at the shelf position, a space is formed between the seat cushion and a floor surface of the vehicle, the floor surface being placed below the seat cushion; and
   the space communicates with a luggage room of the vehicle in a vehicle front-rear direction.

17. The seat for the vehicle according to claim 15, wherein:
   a top face of the seat cushion includes an inclined surface inclined rearward in a vehicle front-rear direction and downward in a vehicle height direction when the seat cushion is placed at the seat position; and
   an angle between the inclined surface and a horizontal plane when the seat cushion is placed at the shelf position is smaller than an angle between the inclined surface and the horizontal plane when the seat cushion is placed at the seat position.

18. The seat for the vehicle according to claim 15, wherein:
   at least one of right and left side walls of the vehicle is provided with an arm rest to be used by an occupant seated in the seat cushion placed at the seat position, the right and left side walls being placed on outer sides of the seat in a vehicle right-left direction;
   when the seat cushion is placed at the seat position, a top face of the seat cushion is placed below a top face of the arm rest; and
   when the seat cushion is placed at the shelf position, the top face of the seat cushion is placed substantially at the same height as the top face of the arm rest in a vehicle height direction.

* * * * *